Sept. 8, 1953     F. A. SHARP     2,651,550
MAGNETIC BEARING SUSPENSION FOR ELECTRIC
MEASURING INSTRUMENTS
Filed March 2, 1951
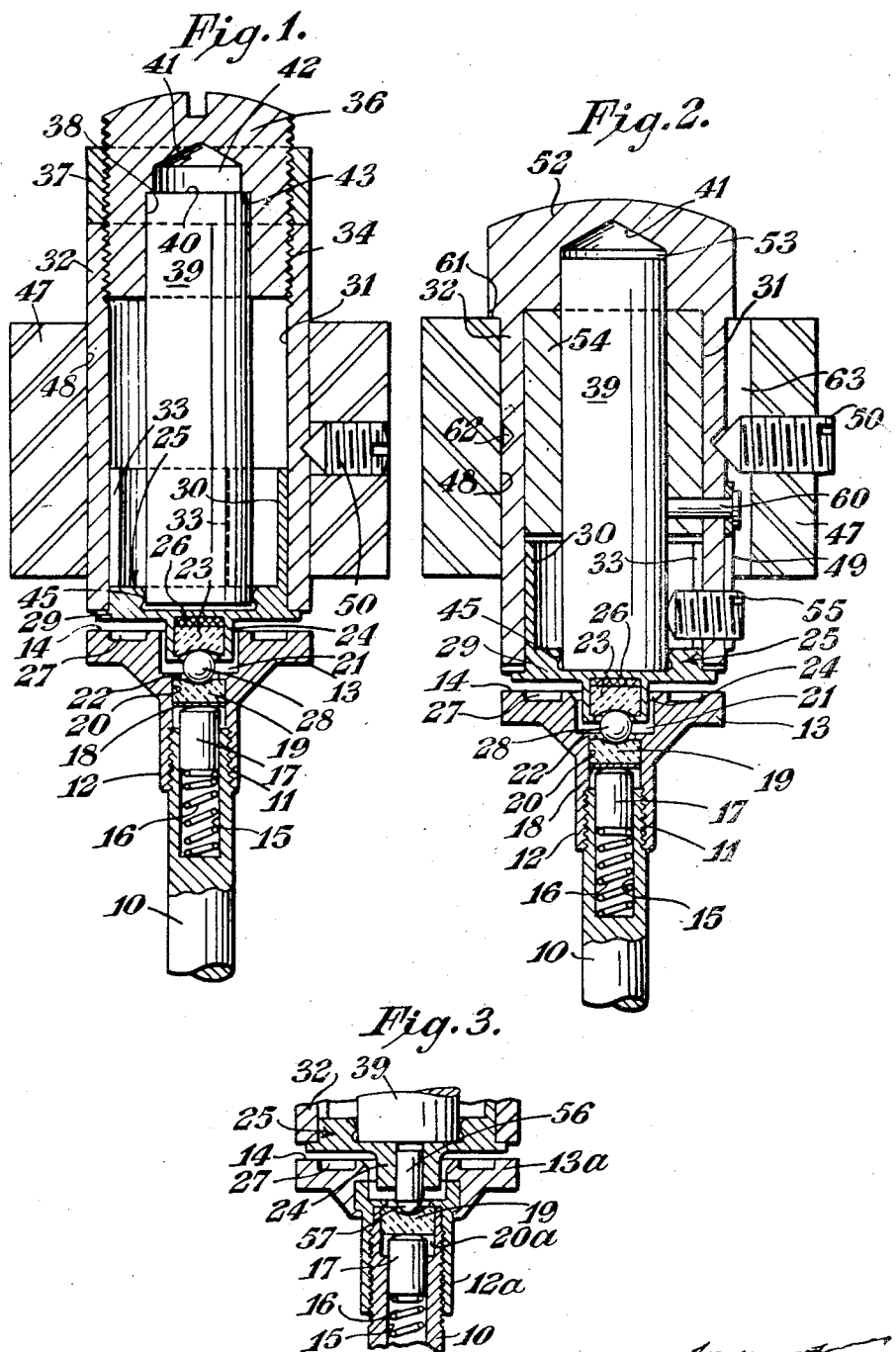
Inventor:
Frank Allen Sharp
By Brown, Jackson, Boettcher & Dienner
Att'ys.

Patented Sept. 8, 1953

2,651,550

UNITED STATES PATENT OFFICE 2,651,550

MAGNETIC BEARING SUSPENSION FOR ELECTRIC MEASURING INSTRUMENTS

Frank Allen Sharp, Enfield, England, assignor to Sangamo Electric Company, Springfield, Ill., a corporation of Illinois Application March 2, 1951, Serial No. 213,497
In Great Britain March 6, 1950

12 Claims. (Cl. 308—1)

This invention relates to bearing constructions for mounting a vertically disposed rotatable spindle, such as the shaft of an electricity supply or watt-hour meter, and is more particularly concerned with the class of bearing construction which utilises the force exerted by magnetic flux to reduce or overcome the gravitational weight of the moving system associated with such spindle.

The object of the invention is to provide an improved construction in which the effect of external magnetic fields is reduced, which is of relatively simple design, in which the upward weight-reducing force of the magnetic flux is readily adjustable and in which means are provided for protecting the bearing surfaces from damage due to mechanical shock particularly during transportation and installation.

According to one aspect of the invention the required upwardly directed weight-reducing force is obtained by providing the upper end of the spindle, e. g. the shaft of an electricity supply meter, with a soft iron or equivalent keeper disc surrounding one of the elements of a thrust bearing, the co-operating, stationary element of which bearing is carried upon or in the lower face of a member comprising a shell of ferromagnetic metal of low retentivity surrounding and substantially enclosing a permanent bar magnet which is magnetised along its principal or longitudinal axis and which axis is in substantial alignment with that of the spindle, the attractive force exerted upon the soft iron disc by the magnetic flux linking therewith in its passage between the lower end of the permanent magnet and the adjacent rim of the surrounding shell being slightly in excess of that necessary to counterbalance the weight of the moving system associated with the spindle.

According to another aspect of the invention the required upward force for reducing or overcoming the weight of the moving system is provided by the magnetic attraction of a soft iron or equivalent armature carried upon the upper end of the spindle of the moving system by a stationary magnetic system disposed above such armature and comprising a longitudinally magnetised bar of highly coercive anisotropic material surrounded by a pot or shell of low retentivity ferromagnetic metal and disposed so as to present an annular flux gap between said magnet and said shell to said armature.

In its preferred form the bar magnet is additionally surrounded, within its shell or pot, by an annular copper sleeve or slug for the purpose of still further reducing the disturbing effects of external magnetic fields upon the permanent magnet.

In order that the above and other features of the invention may be more readily understood, constructional embodiments thereof will now be described with reference to the accompanying drawings in which:

Fig. 1 is a vertical transverse section taken through an upper end bearing of an electricty supply meter spindle and the magnetic supporting means according to the invention.

Fig. 2 is a similar transverse vertical cross-section showing an alternative arrangement, while Fig. 3 is a fragmentary view illustrating how either of the arrangements of Fig. 1 or 2 may be modified to incorporate a slightly different form of jewel bearing.

Referring first to Fig. 1, 10 indicates the upper end of the electricity supply meter spindle which is externally threaded at 11 and receives screwed thereon a sleeve 12 which is integral with a soft iron keeper disc or armature 13 having an upper surface 14 whose plane is normal to the axis of the spindle 10.

The spindle 10 is bored axially at 15 and is provided therein with a helical compression spring 16 seated upon the bottom of the bore and urging upwardly therein a jewel plunger 17 which contacts, through the intermediary of a number of packing washers 18, a shallow cup jewel 19 which is itself axially slidable within the bore 20 of the sleeve portion 12. This bore 20 communicates with a counterbore 21 formed in the soft iron disc 13, both of which bore and counterbore form a continuation of and are in axial alignment with the bore 15 of the meter spindle 10.

The cup jewel 19, which constitutes the lower element of a thrust bearing, is thus normally urged resiliently into contact with a retaining rim 22 or similar constriction of the bore 20 at the bottom of the counterbore 21.

Above this restriction 22 and in the counterbore 21 of the soft iron disc 13 is accommodated the stationary upper jewel element of the bearing and consisting of a similar but inverted shallow cup jewel 23 which is fixed within a dependent cup-shaped extension 24 of a jewel holder 25 made of non-magnetic material such as brass. This upper jewel 23 is fixed in position as by spinning over the lower edge of the cup 24 onto the lower surface of the jewel, a soft paper or like pad 26 being preferably inserted between the upper surface of the jewel and the end of the recess of the cup-shaped extension 24. A ball 28 of suitable alloy metal interposed between the opposing jewel bearing surfaces, which are of concave form, completes the thrust bearing.

The brass jewel holder 25 is in the form of a circular cap 29 having an upstanding cylindrical flange 30 which is a snug fit within the bore 31 of a cylindrical shell 32 formed of mild steel. To facilitate the snug fit of this jewel holder 25, the upstanding flange 30 is preferably slotted at intervals therearound as shown at 33.

The uppermost end of the mild steel shell 32 is internally threaded at 34 and receives therein an externally threaded plug 36 also formed of mild steel and adjustable as to its position by screwing up or down within the threads 34. The desired axial position of the mild steel plug is retained and locked by an external lock nut 37 conveniently formed of brass. The lower, inner, face of the plug 36 is bored axially at 38 and receives therein the upper end of a cylindrical bar 39 of high coercivity anisotropic magnet material. This bar 39 is secured within the plug 36, as by soldering or staking, so as to leave an appreciable air-gap or space between its uppermost end face 40 and the opposing end surface 41 of the bore in the plug 36. This may conveniently be effected in the manner shown by providing a counterbore 42 of very slightly less diameter than that of the bore 38 so as to leave a positioning shoulder 43 against which the upper end face 40 of the magnet bar 39 may positively seat.

The lower end of the magnet bar 39 enters snugly into a short axial counterbore 45 formed in the inner and upwardly directed face of the cap 29 of the jewel holder 25. The constriction formed by this counterbore 45 serves to position accurately the lower end of the magnet bar 39 so that its circular lower end face is coaxial with the axis of rotation of the spindle 10, while allowing up and down adjustment movement of the magnet bar relatively to the jewel holder 25, such up and down movement being brought about by movement of the plug 36. The magnet bar 39 is magnetised longitudinally after assembly within the surrounding shell 32 and is then aged to secure maximum stability.

The shell 32, together with the contained magnet bar 39, is carried in the usual upper bearing mounting position within the frame structure of the meter and part of which is shown at 47. This frame structure may conveniently be of moulded insulating material. The shell is arranged to be axially slidable within a bore 48 in such frame structure for initial setting up and adjustment of the bearing parts and it is held in the required adjusted position by means of a pointed grub screw 50 which engages with the outer surface of the shell 32.

With the arrangement described and with the various parts in position to provide the requisite proper bearing support for the spindle 10, the position of the magnet bar 39 within the shell 32 is then adjusted by rotation of the threaded plug 36 until the proximity of the lower end of the magnet bar to the soft iron disc 13 on the spindle 10 is such as will cause the flux which, in passing between such end of the magnet and the surrounding annular rim of the shell 32, flows also through the disc 13, to be of an intensity which slightly more than overcomes the total weight of the moving system associated with the spindle 10 whereby the previous downward gravitational load is converted into an upthrust of very small value, for example, of the order of only a few grams.

It has been found advantageous to provide an annular groove 27 in the upper surface 14 of the soft iron disc. Such groove assists in reducing the noise created when the spindle 10 is revolving and, by providing a centralising force tending to restore the spindle to a central and axially aligned position after any lateral displacement, considerably reduces the amount of side throw on the spindle. The inner and outer edges of the groove 27 should be in vertical alignment respectively with the edge of the tip of the magnet 39 and the inner edge of the lower annular end surface of the shell 32 while the depth of the groove is conveniently of the order of 0.030 inch.

The lower bearing for the spindle 10 may be of any convenient type, e. g. a sleeve type jewel bearing, but it should be arranged to set a limit of about 0.020 inch to the amount which the spindle 10 can drop for any reason, such as a mechanical jolt, in order that the magnetic pull may properly reassert itself. The resilient mounting of the lower cup jewel 19 reduces or avoids the risk of damage to the bearing surfaces by such mechanical shocks while the shielding of the permanent magnet 39 by the surrounding shell 32 prevents weakening of the magnetic field of such magnet by external fields such as those due to surges or to fields maliciously applied with intent to defraud.

Referring now to Fig. 2 which shows an alternative construction, this comprises the spindle 10, soft iron disc 13, lower jewel 19, and the various associated mounting parts of substantially identical form to those previously described in connection with the embodiment of Fig. 1. In this embodiment, however, the mild steel shell 32 is now formed with a completely closed upper end 52 which is of substantial axial thickness. The upper end of the magnet bar 39 is secured within an upwardly directed counterbore 53 in this upper end 52 and projects downwardly, as before, into a locating counterbore 45 in the cap 29 of the jewel holder 25. Within and substantially filling the annular space between the bore 31 of the shell 32 and the magnet bar 39 above the upper rim of the flange 30 of the jewel holder 25 is disposed a solid copper ring or slug 54.

In this embodiment the axial positioning of the magnet bar 39 is not made adjustable for altering the magnetic pull thereof upon the moving spindle 10 but instead one or more flux-diverting screws 55 made of suitable ferromagnetic metal are provided and directed radially inwards from the lower end of the shell 32 towards the lower end of the magnet bar. These screws conveniently pass through the slots 33 provided in the upstanding flange 30 of the jewel holder 25, such slots being suitably widened for the purpose.

The adjusted position of each flux-diverting screw 55 is conveniently locked or held against accidental displacement by means of a spring clip 49 which is positively anchored at its upper end by means of a pin 60. The latter passes through the shell 32 into the slug 54 and serves also to lock the latter against axial displacement by shock or vibration.

In this embodiment no provision is made for any up and down adjustment movement of the shell 32 and its associated parts within the meter frame structure 47. Instead such shell is positively located by the sealing of a shoulder 61, formed on an enlarged upper end, against the upper surface of the frame structure part 47. The shell 32 is secured, as before, by a pointed grub-screw 50 which, however, seats in a V-section circumferential groove 62 around the outside of the shell. In addition one or more axial grooves 63 is/are provided in the surface of the bore 48 of the meter frame structure 47 for the purpose of allowing the passage of the flux-diverting screws 55 therethrough whereby the completely assembled shell may be withdrawn and replaced after inspection or renewal of the bearing surfaces without disturbing the flux-adjustment.

The operation of this embodiment is substantially identical with that previously described except for the different method of flux adjustment. The presence of the copper sleeve surrounding the permanent magnet has been found appreciably to enhance the immunity of effect upon the device from external magnetic fields particularly those of alternating nature such as are frequently present within an electricity meter of the type particularly referred to.

Numerous modifications can clearly be made without departing from the scope of the invention. For example, the equivalent of the copper slug 54 of the embodiment of Fig. 2 may be incorporated in the embodiment of Fig. 1 while the precise form of the jewel bearing may be materially changed, and one example of an alternative jewel structure, applicable to either of the embodiments so far described, is illustrated in Fig. 3 where the previous upper jewel 23 and the interposed ball 28 are replaced by a downwardly directed pivot pin 56 secured in the underside of the jewel holder 25 and provided at its lower end with a semi-spherical surfaced end 57 which is in bearing engagement with the concave bearing surface on the upper side of the lower jewel 19.

This figure also illustrates an alternative form of soft-iron disc member, applicable to either of the previous embodiments. This modified disc construction is of two-part form consisting of a soft-iron annulus 13a which is secured, as by staking, to a separate mounting sleeve 12a made of brass or other non-magnetic metal. In this construction the lower jewel 19 is made slidable within an enlarged diameter extension 20a of the meter spindle bore 15.

I claim:

1. In a magnetic bearing suspension for a watthour meter of the type having a moving system comprising a spindle rotating about a vertical axis, the combination of a permanent magnet of straight bar type extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, and a rotating magnetic armature disk mounted on said spindle to rotate directly below said inner and outer annular pole faces concentrically thereof, said armature disk cooperating with said inner and outer annular pole faces to establish concentrically disposed inner and outer annular flux gaps therebetween, the flux from said permanent magnet passing through said armature disk and flux gaps in series and exerting a lifting action and a centering action on said spindle.

2. In a magnetic bearing suspension for a watthour meter of the type having a moving system comprising a spindle rotating about a vertical axis, the combination of a permanent magnet of straight bar type extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk cooperating with said inner and outer annular pole faces to establish concentrically disposed inner and outer annular flux gaps therebetween, the flux from said permanent magnet passing through said armature disk and flux gaps in series and exerting a lifting action and a centering action on said spindle, and bearing means for the upper end of said spindle comprising a cup jewel for sustaining upward thrust acting on said spindle.

3. In a magnetic bearing suspension for a watthour meter of the type having a moving system comprising a spindle rotating about a vertical axis, the combination of a permanent magnet of straight bar type extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk cooperating with said inner and outer annular pole faces to establish concentrically disposed inner and outer annular flux gaps therebetween, the flux from said permanent magnet passing through said armature disk and flux gaps in series and exerting a lifting action and a centering action on said spindle, and means for adjusting the strength of the flux threading said inner and outer annular flux gaps.

4. In a magnetic bearing suspension for a watthour meter of the type having a moving system comprising a spindle rotating about a vertical axis, the combination of a permanent magnet of straight bar type extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk cooperating with said inner and outer annular pole faces to establish concentrically disposed inner and outer annular flux gaps therebetween, the flux from said permanent magnet passing through said armature disk and flux gaps in series and exerting a lifting action and a centering action on said spindle, means for adjusting the strength of the flux threading said inner and outer annular flux gaps to adjust the upward lift effective on said spindle, and a thrust bearing at the upper end of said spindle for sustaining any upward thrust on said spindle beyond that necessary to counterbalance the weight of the moving system.

5. In a magnetic bearing suspension for a watthour meter of the type having a moving system comprising a spindle rotating about a vertical axis, the combination of a permanent magnet bar of highly coercive anisotropic material extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, and a rotating magnetic armature disk mounted on said spindle comprising concentric inner and outer annular ribs projecting upwardly from the upper face of said disk disposed directly below said inner and outer annular pole faces substantially in vertical alignment therewith, to establish concentrically disposed inner and outer annular flux gaps therebetween, the flux from said permanent magnet passing through said armature disk and flux gaps in series and exerting a lifting action and a centering action on said spindle.

6. In a magnetic bearing suspension for a watthour meter of the type having a moving system comprising a spindle rotating about a vertical axis, the combination of a permanent magnet bar of highly coercive anisotropic material extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk cooperating with said inner and outer annular pole faces to establish concentrically disposed inner and outer annular flux gaps therebetween, the flux from said permanent magnet passing through said armature disk and flux gaps in series and exerting a lifting action and a centering action on said spindle, said two concentric annular flux gaps being both disposed in substantially the same horizontal plane, and bearing means for the upper end of said spindle comprising a cup jewel for sustaining upward thrust acting on said spindle, said jewel being disposed in substantially the same horizontal plane as said flux gaps.

7. In a magnetic bearing suspension for electric measuring instruments, the combination of a spindle rotating about a substantially vertical axis, a stationary permanent magnet disposed adjacent the upper end of said spindle, an outer tubular shell of magnetic material having its upper end magnetically joined to one pole extremity of said permanent magnet and extending downawrdly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk cooperating with said inner and outer annular pole faces to establish concentrically disposed inner and outer annular flux gaps therebetween, the flux from said permanent magnet passing through said armature disk and flux gaps in series and exerting a lifting action and a centering action on said spindle, said outer tubular shell of magnetic material reducing the disturbing effects of external magnetic fields upon said permanent magnet, and means for adjusting the vertical span of one of said flux gaps to adjust the strength of the flux threading said gaps.

8. In a magnetic bearing suspension for electric measuring instruments, the combination of a spindle rotating about a substantially vertical axis, a tubular shell of magnetic material extending upwardly above the upper end of said spindle, an adjusting plug of magnetic material having screw threaded mounting at the upper end of said shell, a bar type of permanent magnet having its upper end secured to said adjusting plug and extending downwardly therefrom in said shell, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk cooperatnig with said inner and outer annular pole faces to establish concentrically disposed inner and outer annular flux gaps therebetween, the flux from said permanent magnet passing through said armature disk and flux gaps in series and exerting a lifting action and a centering action on said spindle, rotation of said adjusting plug in its screw threaded mounting in said shell serving to adjust the distance between the lower end of said magnet and said armature disk.

9. In a magnetic bearing suspension for a watthour meter of the type having a moving system comprising a spindle rotating about a vertical axis, the combination of a permanent magnet of straight bar type extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk co-operating with said inner and outer annular pole faces to establish concentrically disposed inner and outer annular flux gaps therebetween, the flux from said permanent magnet passing through said armature disk and flux gaps in series and exerting a lifting action and a centering action on said spindle, said outer magnetic shell reducing the disturbing effects of external magnetic fields upon said permanent magnet, bearing means for the upper end of said spindle comprising a pair of coacting anti-friction bearing elements sustaining upward thrust acting on said spindle, means mounting one of said bearing elements for axial sliding movement, and a cushioning spring pressing against said latter bearing element for absorbing shock acting lengthwise of said spindle.

10. In a magnetic bearing suspension for a watthour meter of the type having a moving system comprising a spindle rotating about a vertical axis, the combination of a permanent magnet of straight bar type extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk co-operating with said inner and outer annular pole faces to establish concentrically disposed inner and outer annular flux gaps therebetween, the flux from said permanent magnet passing through said armature disk and flux gaps in series and exerting a lifting action and centering ation on said spindle, said outer tubular shell of magnetic material reducing the disturbing effects of external magnetic fields upon said permanent magnet, and an annular copper sleeve interposed between sid tubular shell and said permanent magnet for the purpose of still further reducing the disturbing effects of external magnetic fields upon said permanent magnet.

11. In a magnetic bearing suspension for a watthour meter of the type having a moving system comprising a spindle rotating about a vertical axis, the combination of a permanent magnet of straight bar type extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, and the lower end of said outer shell defining a downwardly facing outer annular pole face of opposite polarity disposed concentrically of said inner annular pole face and magnetically spaced therefrom, a rotating magnetic armature disk mounted on said spindle to rotate directly below said inner and outer annular pole faces concentrically thereof, said armature disk co-operating with said inner and outer annular pole faces to establish concentrically disposed inner and outer annular flux gaps therebetween, the flux from said permanent magnet passing through said armature disk and flux gaps in series and exerting a lifting action and a centering action on said spindle, and an adjustable magnetic shunt acting between the lower portion of said shell and the lower portion of permanent magnet for adjusting the effective strength of the magnetic flux operative upon said armature disk by diverting flux to avoid its passing through said armature disk.

12. In a magnetic bearing suspension for an instrument having a moving system comprising a spindle rotating about a vertical axis, the combination of a permanent magnet extending upwardly above the upper end of said spindle, an outer tubular shell of magnetic material having its upper end magnetically joined to the upper pole extremity of said permanent magnet and extending downwardly around said magnet in magnetically spaced relation thereto, the lower end of said permanent magnet defining a downwardly facing inner annular pole face of one polarity, the lower end of said outer shell defining a downwardly facing outer annular pole face of opposite polarity disposed concentrically of said inner annular pole face and magnetically spaced therefrom, and a rotating magnetic armature disk mounted on said spindle to rotate directly below said inner and outer annular pole faces concentrically thereof, said armature disk cooperating with said inner and outer annular pole faces to establish concentrically disposed inner and outer annular flux gaps therebetween, said inner and outer annular flux gaps being disposed in substantially the same horizontal plane and the flux from said permanent magnet passing through said armature disk and flux gaps in series and exerting a lifting action and a centering action on said spindle.

FRANK ALLEN SHARP.

References Cited in the file of this patent

UNITED STATES PATENTS

| Number | Name | Date |
|---|---|---|
| 2,160,405 | Mallalieu | May 30, 1939 |
| 2,209,969 | Green | Aug. 6, 1940 |
| 2,275,839 | Boehne | Mar. 10, 1942 |
| 2,333,647 | Green | Nov. 9, 1943 |
| 2,439,970 | Fox | Apr. 10, 1948 |
| 2,446,579 | Fritzinger | Aug. 10, 1948 |

FOREIGN PATENTS

| Number | Country | Date |
|---|---|---|
| 580,896 | Great Britain | Sept. 24, 1946 |